(12) United States Patent
Andre et al.

(10) Patent No.: US 7,961,834 B2
(45) Date of Patent: Jun. 14, 2011

(54) STORAGE DEVICE FOR STORING AND/OR TRANSPORTING NUCLEAR FUEL ASSEMBLIES

(75) Inventors: Regis Andre, Paris (FR); Guillaume Foussard, Le Mesnil Saint Denis (FR)

(73) Assignee: TN International, Montigny le Bretonneux (FR)

( * ) Notice: Subject to any disclaimer, the term of this patent is extended or adjusted under 35 U.S.C. 154(b) by 266 days.

(21) Appl. No.: 11/998,109

(22) Filed: Nov. 27, 2007

(65) Prior Publication Data

US 2008/0123798 A1    May 29, 2008

(30) Foreign Application Priority Data

Nov. 27, 2006    (FR) ...................................... 06 55110

(51) Int. Cl.
*G21C 19/00* (2006.01)
*G21F 5/00* (2006.01)
(52) U.S. Cl. .................. 376/272; 250/506.1; 250/507.1
(58) Field of Classification Search .................... 376/272
See application file for complete search history.

(56) References Cited

U.S. PATENT DOCUMENTS

| | | | | |
|---|---|---|---|---|
| 4,781,883 A | * | 11/1988 | Daugherty et al. | 376/272 |
| 4,896,046 A | * | 1/1990 | Efferding | 250/507.1 |
| 6,674,827 B2 | * | 1/2004 | de la Pena et al. | 376/272 |
| 6,839,395 B2 | * | 1/2005 | Ohsono et al. | 376/272 |
| 7,177,384 B2 | * | 2/2007 | Murakami et al. | 376/272 |
| 2008/0253495 A1 | * | 10/2008 | Baudouin et al. | 376/272 |

FOREIGN PATENT DOCUMENTS

| | | |
|---|---|---|
| EP | 1 235 231 A1 | 8/2002 |
| FR | 2 650 113 | 1/1991 |
| FR | 2 872 955 A1 | 1/2006 |
| FR | 2872955 A1 * | 1/2006 |
| WO | WO 96/37896 | 11/1996 |

OTHER PUBLICATIONS

French Preliminary Seach Report, FR 06 55110, dated Jun. 28, 2007.

* cited by examiner

*Primary Examiner* — Rick Palabrica
*Assistant Examiner* — Erin M B Leach
(74) *Attorney, Agent, or Firm* — Nixon Peabody LLP

(57) ABSTRACT

The invention relates to a storage device (1) for the storing and/or transporting of nuclear fuel assemblies, including a plurality of adjacent housings each having a lateral wall and being able to receive a nuclear fuel assembly, the lateral walls being realized at least in part using stacking and intercrossing slotted structural assemblies (6a, 6b), each structural assembly including at least one plate (22) realized in a first material comprising aluminum. According to the invention, each structural assembly (6a, 6b) further includes a tubular cross-section element (20) inside of which is located said at least one plate (22), this tubular cross-section element (20) being realized in a second material selected from steels and titanium and alloys thereof.

20 Claims, 9 Drawing Sheets

STORAGE DEVICE FOR STORING AND/OR TRANSPORTING NUCLEAR FUEL ASSEMBLIES

CROSS REFERENCE TO RELATED APPLICATIONS OR PRIORITY CLAIM

This application claims priority to French Patent Application No. 06 55110, filed Nov. 27, 2006.

TECHNICAL FIELD

This invention generally relates to a storage device for storing and/or transporting nuclear fuel assemblies. More particularly but not exclusively, the invention relates to a storage device for the transporting and storing of irradiated nuclear fuel assemblies. This type of device, normally subjected to high temperatures, can require, in cases where the temperatures are the highest, steel elements in order to ensure mechanical resistance that is satisfactory overall.

The invention further relates to a container including a casing wherein is disposed such a storage device for storing and/or transporting nuclear fuel assemblies.

PRIOR ART

Traditionally, such devices also called storage "baskets" or "plate racks", are of a substantially circular cylindrical cross-section form, and have a plurality of adjacent housings each able to receive a nuclear fuel assembly.

This type of device is designed to be able to simultaneously satisfy four essential functions, which shall briefly be exposed hereinbelow.

It entails indeed firstly evacuating the heat given off by the irradiated fuel assemblies. This requires the use of a material having high thermal conductivity, with aluminium or an alloy thereof being generally used. This first function is therefore referred to as the thermal function.

The second function consists in maintaining the sub-criticality of the storage device when the latter is loaded with nuclear fuel assemblies, i.e. to satisfactorily limit the neutron interaction between the assemblies in order to avoid any fission reaction runaway. This is substantially realised by incorporating into the structure of the storage basket neutron-absorbing chemical elements, called neutrophage elements, such as boron. The material doped as such with neutrophage elements is called neutron material. Maintaining the sub-criticality can require providing spaces likely to be filled with water, for example within the interior of the partitions forming the housings of the storage device.

Moreover, maintaining the sub-criticality of the storage device, when the latter is loaded with nuclear fuel assemblies, also requires ensuring that this device has sufficient mechanical resistance, with this mechanical function thus constituting the third function. Indeed, too much deformation in the geometry thereof can affect the neutron interaction between the assemblies, i.e. criticality, in an inacceptable manner.

Note that the mechanical resistance of the device must comply with regulatory safety requirements for the transport/storage of nuclear materials, especially concerning the test for free-fall onto a non-deformable target. These drop tests are realised by orientating the longitudinal axis of the casing, and thus of the storage device, either in a manner that is substantially perpendicular to the impact surface (this is generally referred to as axial or vertical drop), or in a manner that is substantially parallel to the latter (this is then generally referred to as a lateral or horizontal drop). After these tests, any deformations of the basket must not negatively affect criticality in an inacceptable manner, which imposes having a basket that is as mechanically resistant as possible. This can require, especially when the temperatures reached by the basket are high, the use of structural assemblies made from steel in addition to aluminium elements, whose mechanical resistance is often insufficient at high temperatures.

Finally, as with all structures comprising the casing wherein the storage device is placed, the basket itself participates in radiation protection with regards to neutrons and gamma radiation, with this radio protection function constituting the fourth function. Furthermore, it is noted that if aluminium and alloys thereof, materials with a low density, participate primarily in neutron shielding, high density materials, such as steel, participate primarily in gamma shielding.

It is also to be noted that during the designing of such storage devices, economic constraints are also taken into account. Indeed, this type of constraint aims at increasing the payload of a container whose maximum weight, when it is loaded with nuclear fuel, is limited by operating constraints. The objective consequently consists in proposing technical solutions that make it possible to lighten the casing as much as possible, on the one hand, but also the storage device, on the other hand.

In prior art, several realisations are known consisting of stacking and intercrossing slotted structural assemblies, with the purpose of obtaining the adjacent housings of the storage device. By way of example, FR-A-2 872 955 discloses slotted structural assemblies each including two spaced plates realised in a neutron material and of high thermal conductivity, such as an aluminium alloy including boron, as well as an intermediary steel structure taking generally the form of a bar of rectangular cross-section disposed between the plates and in contact with the latter. Furthermore, as is generally the case for stacked and intercrossed structural assemblies, the stacking direction of these assemblies is parallel to the longitudinal axis of the basket, thus implying that each intermediary steel structure is arranged substantially orthogonally to this same longitudinal axis of the basket.

In this regard, it has been observed that the overall form of a rectangular cross-section retained for the intermediary steel structure is not an optimal solution to procure maximum mechanical strength for the associated basket, primarily concerning vertical and lateral free-fall tests. This can be explained in particular by the fact that these intermediary steel structures have a bending inertia module that is relatively low for a given linear density, which is of a nature to generate major constraints and deformations in the latter in lateral free-fall as well as in vertical free-fall, more particularly when it is necessary to retain in translation the storage device is such a way that the latter does not impact the lid of the casing.

Moreover, the longitudinal discontinuities generated by the stack of intermediary steel structures do not make it possible to dispose of optimised gamma protection with regards to the weight of the added steel.

OBJECT OF THE INVENTION

The purpose of the invention is therefore to propose a storage device for the storing and/or transporting of nuclear fuel assemblies, this device eliminating the aforementioned drawbacks, pertaining to the realisations of prior art.

To do so, the object of the invention is a storage device for the storing and/or transporting of nuclear fuel assemblies, the device including a plurality of adjacent housings, each having a lateral wall and being able to receive a nuclear fuel assembly, with lateral walls being realised at least in part using stacking and intercrossing slotted structural assemblies, each structural assembly including at least one plate realised in a first material comprising aluminium, such as an aluminium alloy. According to the invention, each structural assembly further comprises a tubular cross-section element inside which is found said at least one plate, this tubular cross-section element being realised in a second material selected from the steels and titanium and alloys thereof.

Advantageously, the mechanical strength function of the storage device is substantially provided by the tubular cross-section elements, which, by nature of the second material comprising them and by their specific form, are each capable of offering very satisfactory mechanical rigidity, thus making it possible for the associated container to easily comply with the safety regulatory requirements, primarily concerning vertical and lateral free-fall tests, while still complying with the weight limits imposed by operating constraints. This can be explained in particular by the fact that these tubular cross-section elements, made from steel, titanium or one of the alloys thereof, have a high bending inertia module for a given linear density, providing a substantial limitation of the constraints and deformations of the latter in lateral free-fall as well as in vertical free-fall. Indeed, for a given linear density, the bending strength of a structural element, for example made of steel, has shown to be optimal in the two fall cases mentioned, if the material comprising it is kept as far away as possible from the neutral axis of the bending element, i.e. the two axes of symmetry thereof. Consequently, the tubular form retained in this invention constitutes an optimal form for the steel structure providing the essential portion of mechanical resistance. Of course, this remark also applies to the case where the second material chosen is titanium or one of the alloys thereof, even if the use of steel, and more preferably of stainless steel, remains preferred. It is noted that this optimisation is particularly advantageous for a privileged application of this invention wherein the basket is stopped in translation at a distance from the lid of the casing containing this same basket, in the sense where such a configuration causes high flexional stress on the slotted structural assemblies, during the realisation of the aforementioned free falls.

Moreover, the mechanical strength of the storage device according to the invention is also optimised by the fact that each tubular cross-section element extends preferentially across the entire thickness of the lateral wall of the housing of the assembly that it defines, and no longer across an interior portion solely of this thickness, as was in particular observed in the storage basket of FR-A-2 872 955. This specificity stems in particular from the characteristic according to which each plate realised in the first material is disposed inside its associated steel tubular cross-section element.

Furthermore, it is indicated that another advantage stemming from the fact that the exterior portion of each slotted structural assembly is constituted by the steel tubular cross-section element, resides in the possibility of forming, using these stacked and intercrossed tubular cross-section elements, a steel structure extending in a substantially continuous manner over the entire length of the basket. Other than the fact that these tubular cross-section elements make it possible to further reinforce the mechanical strength of the basket, the continuity of the aforementioned steel structure offers very satisfactory shielding, especially with regards to gamma rays.

Moreover, the storage device proposed has a design of low complexity based on the use of inexpensive elements of simple geometry, and able to be easily assembled in relation to one another. Consequently, the total cost of the device can be decreased compared to those observed in prior art. As such, it is indicated that the mechanical joints between the stacked and intercrossed tubular cross-section elements being realised using slots provided for this purpose on these same tubular cross-section elements, it is advantageously no longer necessary to provide centring pins between the steel or titanium elements at the cross-overs of the latter, and/or screws between the steel or titanium elements and the neutrophage elements, as was the case in the realisations of prior art. Other than the mounting facility that stems from this, this suppression of centring pins and/or screws advantageously reinforces the overall mechanical strength of the storage basket, given that the cross-sections that are resistant to the cross-overs are no longer reduced.

Furthermore, it is noted that the device according to the invention has a design such that it can easily satisfy all four aforementioned essential functions, with the mechanical strength requirement being of course primarily provided by the steel tubular cross-section elements.

Indeed, in the preferential case where the plate(s) of each of the structural assemblies of the device are realised in a first material comprising aluminium and a neutrophage element (s), as for example an aluminium and boron alloy, the transfer of the heat is then substantially provided by the presence of aluminium. In this case, maintaining the sub-criticality of the storage device, when the latter is loaded with nuclear fuel assemblies, is then guaranteed preferentially using the boron provided in the plates.

In this regard, as shall be described hereinafter, it is noted that the spacing of the two plates provided on a same structural assembly makes it possible to define a space likely to be occupied by water, still with the purpose of maintaining the sub-criticality of the storage device. Finally, as was covered hereinabove, the shielding with regards to gamma rays is provided in a very satisfactory manner by the steel structure extending in a substantially continuous manner across the entire length of the basket, the neutron shielding being substantially provided by the presence of aluminium in the first material.

It is noted that if the neutrophage element(s) are indeed preferentially provided within the first material constituting the plates, they could alternatively be provided within the second material constituting the tubular cross-section elements, or even provided simultaneously within the first and second materials. Regardless of the case, these elements are selected from the group consisting of the following elements: boron, gadolinium, hafnium, cadmium, indium, samarium and europium, with a mixture of the latter being of course possible, without leaving the scope of the invention.

Furthermore, as mentioned previously, each housing has a lateral surface delimiting it, with this lateral surface being at least partially constituted by the steel tubular cross-section elements of the slotted structural assemblies forming the lateral wall of the housing.

More preferably, for each structural assembly, the steel tubular cross-section element extends between an upper edge and a lower edge interconnected by two lateral flanks, said at least one plate being slid between the upper and lower edges. In other terms, the two edges of each plate in neutron material are intended to respectively face the upper and lower edges, with operating clearance being provided in order to allow for mounting of one into the other by sliding, and in order to be able to handle the differential expansion encountered due to the distinct nature of the materials used for these two parts slid one into the other.

This specificity implies that the height of the plate in neutron material is substantially identical to the inside height of its associated tubular cross-section element, in such a way that these plates can together form a structure in neutron material and with high thermal conductivity extending also in a substantially continuous manner across the entire length of the basket. For this reason, maintaining the sub-criticality, the transferring of the heat and the neutron shielding are provided under good conditions by these plates, still due to the quasi-continuity obtained along the lateral walls of the housings.

According to a preferred embodiment of the invention, said at least one plate is constituted by a single plate. So, it is arranged more preferably so that the latter also be slid between the two lateral flanks of the steel tubular cross-section element. In other terms, the two lateral sides of the plate in neutron material are respectively intended to be opposite/across from the interior sides of the lateral flanks of the tubular cross-section element, with operating clearances being also provided in order to allow for mounting and to handle the differential expansion. This preferred embodiment, wherein the single plate in neutron material occupies almost all of the inside space defined by the tubular cross-section element associated thereof, is preferentially intended for the constitution of a storage basket for fuel assemblies of the BWR (Boiling Water Reactor) type, wherein the lateral walls of the housings are not usually equipped with sheets of water for maintaining the sub-criticality.

According to another preferred embodiment of the invention, said at least one plate is constituted by two plates spaced one in relation to the other. In this regard, it is noted that the spacing between the plates of each of the structural assemblies makes it possible to define spaces likely to be occupied by water, still with the purpose of maintaining the sub-criticality of the storage device, when the latter is loaded with nuclear fuel assemblies. Consequently, this other embodiment is preferentially intended for the constitution of a storage basket for fuel assemblies of the PWR (Pressurised Water Reactor) type.

Preferably, the two spaced plates respectively face the interior sides of the two lateral flanks of the steel tubular cross-section element, with these plates being able respectively to be in facial contact with the interior sides of the two lateral flanks, with operating clearances nevertheless provided so as to allow for mounting by sliding of each plate in the tubular cross-section element, and in order to handle the differential expansion.

In the preferred embodiment, it can be arranged so that the two plates in neutron material are fully independent from each other, or incorporated within a cross-section structure in the general form of an H or of a tube, with the two plates respectively constituting the two flanks of this H or tube. In this latter case, the cross-section structure in the general form of an H or of a tube can be integrally formed, or obtained using fixedly assembled parts in relation to one another.

Still preferably and for each of the two aforementioned preferred embodiments, at least one structural assembly and more preferably each of them, have an upper portion provided with upper slots as well as a lower portion provided with lower slots, with the upper and lower slots having substantially the same height. Without limitation, it is noted that the upper and lower portions indicated hereinabove are of course to be considered according to the stacking direction of the structural assemblies. Thus, the upper portion is located at the edge of the tubular cross-section element oriented towards the head plate of the storage device, and the lower portion at the level of the opposite edge, i.e. that oriented towards the base of the storage device. Otherwise, this reverts to saying that the upper portion is located at the level of the edge of the tubular cross-section element oriented towards the lid of the casing associated to the storage device, and the lower portion at the level of the opposite edge, i.e. that oriented towards the base of the casing.

More preferably, in order to obtain a housing lateral wall that is quasi-continuous along the longitudinal axis of the storage device, the sum of the heights of an upper slot and a lower slot is approximately equal to half of the height of the structural assembly.

Nevertheless, it is noted that structural assemblies could alternatively be provided having solely upper slots or solely lower slots, without leaving the scope of the invention.

In the preferred case where the structural assemblies have upper slots as well as lower slots, of identical heights, it is arranged such that each of the upper and lower slots is realised using a notch formed in the steel tubular cross-section element, and a notch formed in each plate of the structural assembly.

Alternatively, at least one structural assembly and more preferably each of them, has an upper portion provided with upper slots as well as a lower portion provided with lower slots, with the upper slots having a height that is lower than that of the lower slots.

In this other case, it can indifferently be arranged such that each of the upper and lower slots be realised using a notch formed in the steel tubular cross-section element and a notch formed in each plate of the structural assembly, or that each of the lower slots always be realised using a notch formed in the steel tubular cross-section element and a notch formed in each plate of the structural assembly, with the upper slots being realised solely using a notch formed in the steel tubular cross-section element.

This latter configuration is especially provided in order to reinforce the mechanical rigidity of the storage device in case of a vertical free-fall of the container aiming to strike the upper portion of the latter, equipped with a system of closure such as a lid, against a surface of impact, especially when this storage device is provided to be locked in translation in relation to the lateral body of the casing according to the longitudinal axis of the latter, at a distance from the lid.

Effectively, during the impact following such a vertical free-fall, the steel tubular cross-section elements stopped in translation at the ends thereof, are subject to bending, with the sweep establishing itself in the direction of the system of closure, i.e. towards the upper portion of the container then oriented towards the bottom. This bending causes a closing of the lower slots of the tubes and an opening of the upper slots. Given that the tubes are highly adjusted to the cross-overs, the clearance that it is necessary to fill so that the reclosing slot comes into contact with the intercrossed tube is highly reduced. When bending occurs, the reclosing lower slot thus comes into contact rapidly with the intercrossed tube housed in this slot, thus causing a considerable increase in the stiffness in the cross-over zone, and thus a decrease in constraints and deformations.

Note that when the storage device is not intended to be retained in translation, a case that can be considered especially when the mechanical strength of the system of closure is sufficient to retain the weight of the storage device during a fall with side impact of this system of closure, the storage device impacts the lid across its entire cross-section. The structural assemblies of the storage device are in this case subject to very little or no bending, in such a way that it is then not necessary to provide slots of different heights.

More preferably, the steel tubular cross-section element of each structural assembly has a substantially rectangular or square cross-section.

Still preferentially, the storage device further includes a plurality of perimeter walls arranged around the stack of structural assemblies. In this regard, it is more preferably arranged such that each structural assembly has two opposite ends each mounted on one of said plurality of perimeter walls, in such a way that a clearance is present between any two directly consecutive structural assemblies of a same lateral wall.

As such, this special arrangement makes it possible to dissociate the maintaining of each of the structural assemblies, which are therefore maintained on the perimeter walls independently from one another. Generally, with such an arrangement, justification of mechanical strength of the totality of the basket in terms of axial fall, particularly when the basket is stopped in translation at a distance from the lid of the casing, can then advantageously be provided by the simple justification of the mechanical strength of any one of the structural assemblies of this basket.

The purpose of the invention is also a container for the storing and/or transporting of nuclear fuel assemblies, this container including a casing inside of which is housed a storage device such as described hereinabove.

More preferably, the casing includes a base, a lid, as well as a lateral body extending around a longitudinal axis of the casing merged with a longitudinal axis of the storage device, this storage device being locked in translation at a distance from the lid in relation to the lateral body of the casing, along the longitudinal axis of the casing, in the direction of this lid.

This makes it possible to avoid the storage device coming to impact the lid of the casing during a vertical free-fall, which would be likely to cause a rupture in the seal of the casing provided on this same lid.

Finally, it is provided that the locking in translation of the storage device is carried out using stop means that are attached to the lateral body of the casing and cooperating with perimeter walls of the storage device, arranged around the stack of structural assemblies. In such a case where the stop means cooperate more preferably solely with the perimeter walls but not with the structural assemblies, it is noted that the tubular form of the steel elements is entirely suitable to procuring mechanical resistance that is satisfying within the framework of a vertical free-fall.

Nevertheless, it would also be possible to provide stop means taking the form of a plate referred to as "head plate" solidly inserted into the casing at a distance from the lid, plate on which would come as support the structural assemblies of the upper portion of the storage basket, without leaving the scope of the invention.

Other advantages and characteristics of the invention shall appear in the detailed description without limitation hereinbelow.

BRIEF DESCRIPTION OF THE DRAWINGS

This description shall be carried out with regards to the annexed drawings amongst which;

FIGS. 3a and 3b show perspective views of a slotted structural assembly used in a storage device for the storing and/or transporting of nuclear fuel assemblies according to a first preferred embodiment of this invention, with FIG. 3b being an exploded view of FIG. 3a;

FIGS. 5a and 5b show perspective views of a slotted structural assembly used in a storage device for the storing and/or transporting of nuclear fuel assemblies according to an alternative of the first preferred embodiment of the invention, with FIG. 5b being an exploded view of FIG. 5a;

FIG. 6b shows a transversal cross-section view of one of the two slotted structural assemblies shown in FIG. 6a;

DETAILED DESCRIPTION OF PREFERRED EMBODIMENTS

Figure 1:
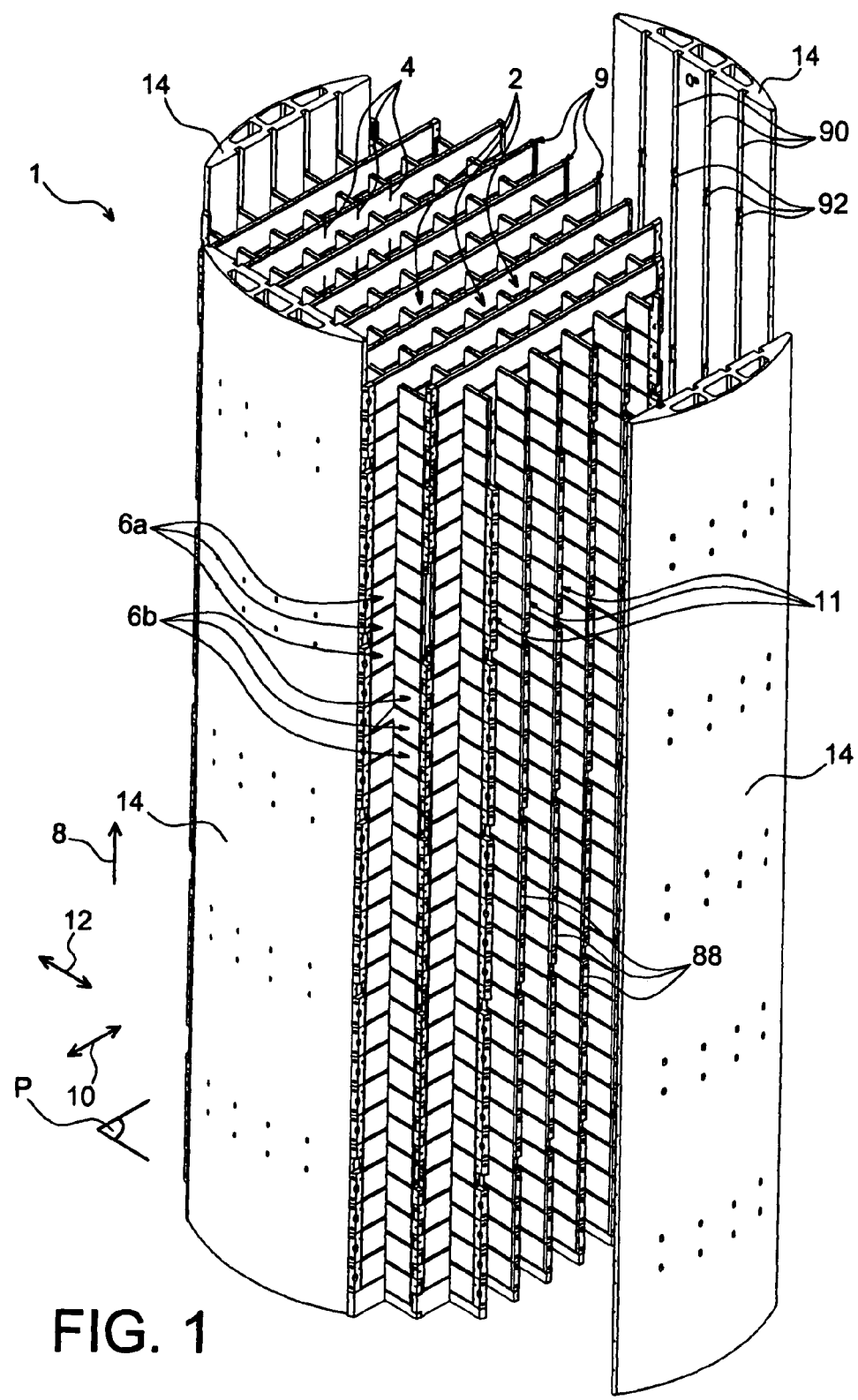
FIG. 1 shows a perspective view of a storage device for the storing and/or transporting of nuclear fuel assemblies, briefly showing the principle of this invention.

In reference to FIG. 1, a storage device 1 is shown provided to be placed in a casing (not shown in this figure) intended for the transporting and/or storing of nuclear fuel assemblies (not shown), more preferably irradiated.

As can be seen in FIG. 1, storage device 1 includes a plurality of adjacent housings 2 disposed in parallel, with the latter extending each along a longitudinal axis 4. Housings 2 are each able to receive at least one fuel assembly of square cross-section, and more preferably a single one.

Housings 2 are therefore provided in such a way that they are juxtaposed one in relation to the others. They are realised by the intermediary of a plurality of slotted structural assemblies 6a, 6b, these assemblies 6a, 6b being stacked according to a stacking direction that is parallel to the longitudinal axes 4 of housings 2, as shown schematically by arrow 8 in FIG. 1. More precisely, stacking direction 8 extends from the bottom of a storage device towards a closing plate of the storage device (not shown). By convention, in the rest of this description, it is admitted that the notion of "height" is to be associated to stacking direction 8, which is also parallel to a longitudinal axis (not shown) of device 1.

As can be observed on this same FIG. 1, slotted structural assemblies 6a, 6b are intercrossed, more preferably perpendicularly. In other terms, assemblies 6a are parallel in relation to each other, while assemblies 6b are also parallel in relation to each other, but perpendicularly to assemblies 6a.

When they are stacked according to stacking direction 8, structural assemblies 6a, 6b form together the lateral wall of each of housings 2, this lateral wall having in this second preferred embodiment a transversal cross-section of substantially square form. Of course, the lateral wall of housings 2 could be presented in any other form authorising the maintaining of a fuel assembly of a different form, such as a hexagonal form.

Therefore, in the example shown in FIG. 1 where housings 4 are of a square cross-section, structural assemblies 6a form vertical partitions 9 parallel to direction 10 and to stacking direction 8, while structural assemblies 6b form vertical partitions 11 parallel to direction 12 and to stacking direction 8, with directions 8, 10 and 12 being perpendicular to each other.

Preferably, each of assemblies 6a, 6b extends between two perimeter walls 14 to which it is integral, these perimeter walls 14 make it possible to laterally close storage device 1. By way of example without limitation and as shown, these perimeter walls 14 can be provided in the number of four, each extending over the entire height of device 1, and constituting a perimeter portion of the lateral wall of the perimeter housings 2 of this device 1. Furthermore, it can alternatively be provided that each perimeter partition 14 be realised by the intermediary of a plurality of sections of stacked partitions according to direction 8, without leaving the scope of the invention.

Moreover, it is noted that each of vertical partitions 9, 11 participates in the formation of a portion of the lateral wall of several housings 2 disposed on either side of the vertical partition concerned.

As shall be explained in a detailed manner hereinafter, each of the slotted structural assemblies 6a, 6b is designed using a tubular cross-section element, realised in a second material, inside of which is housed at least one plate realised in a first material. The first material is more preferably that comprising neutrophage element(s), and therefore preferentially takes the form of an aluminium and boron alloy, even if other neutrophage elements could be adopted by those skilled in the art, such as gadolinium, hafnium, cadmium, indium, samarium, europium, etc. However, other aluminium-based materials can also be considered to constitute this first material, such as a composite material constituted of a matrix comprising an aluminium alloy and boron carbide. Moreover, the second material constituting the tubular cross-section elements is more preferably steel, such as stainless steel, even if the use of titanium or the alloys thereof can also be considered due to the high performance in terms of mechanical resistance that it is capable of procuring.

As such, still in reference to FIG. 1, it can briefly be seen that each of the two lateral flanks of a steel tubular cross-section element is parallel to stacking direction 8 as well as to one of directions 10, 12, and participates in the definition of a plurality of housing 2.

Figure 2:
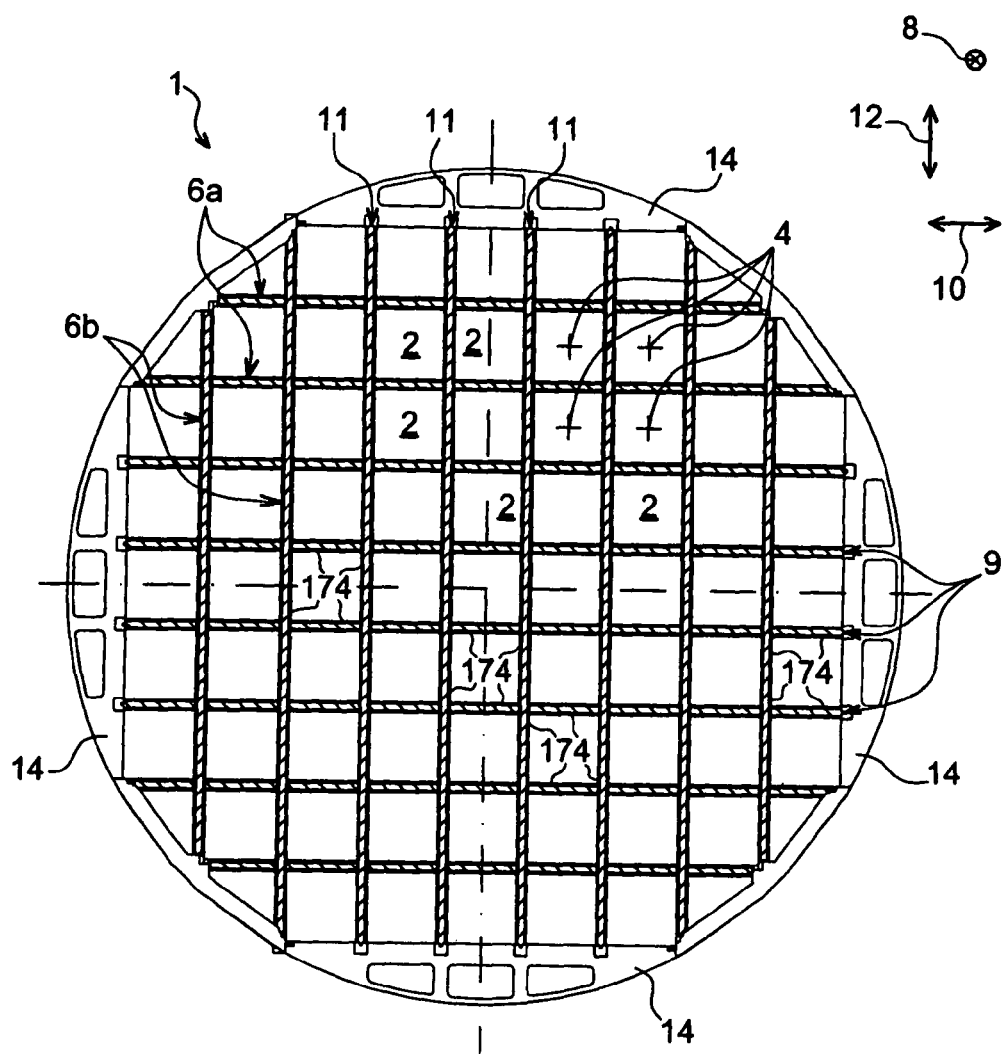
FIG. 2 shows a cross-section view taken according to plane P of FIG. 1, plane P being perpendicular to a stacking direction of the slotted structural assemblies of the storage device.

Now in reference to FIG. 2, it can be seen that housings 2, whose lateral wall is formed by vertical partitions 9, 11, 14 are each delimited interiorly by a lateral surface 174, of a square cross-section. It can be provided that this lateral surface 174 is at least partially constituted by the lateral flanks of the steel tubular cross-section elements of structural assemblies 6a, 6b forming respectively vertical partitions 9, 11.

As can be clearly seen in FIG. 2, only the lateral surface 174 of perimeter housings 2 is not entirely constituted by the lateral flanks, since a portion of the lateral surface of each of these perimeter housings 2 is in this case also formed using a perimeter partition 14.

Figure 3A:
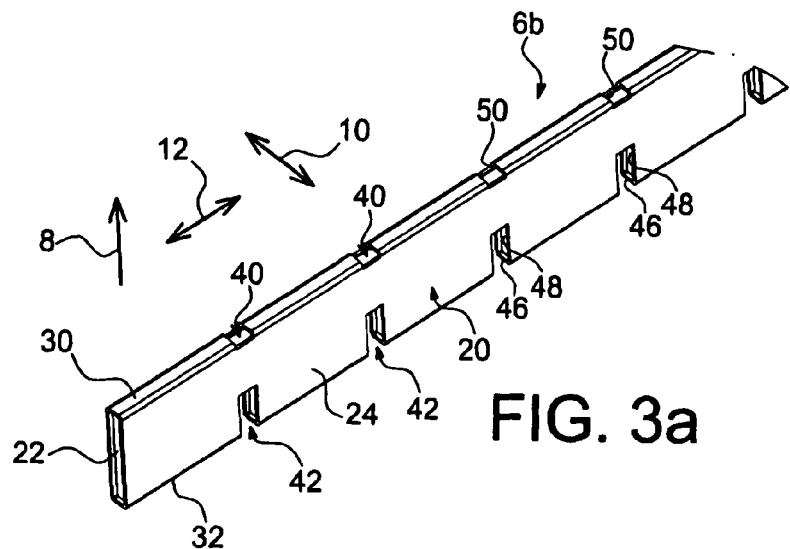
Figure 3B:
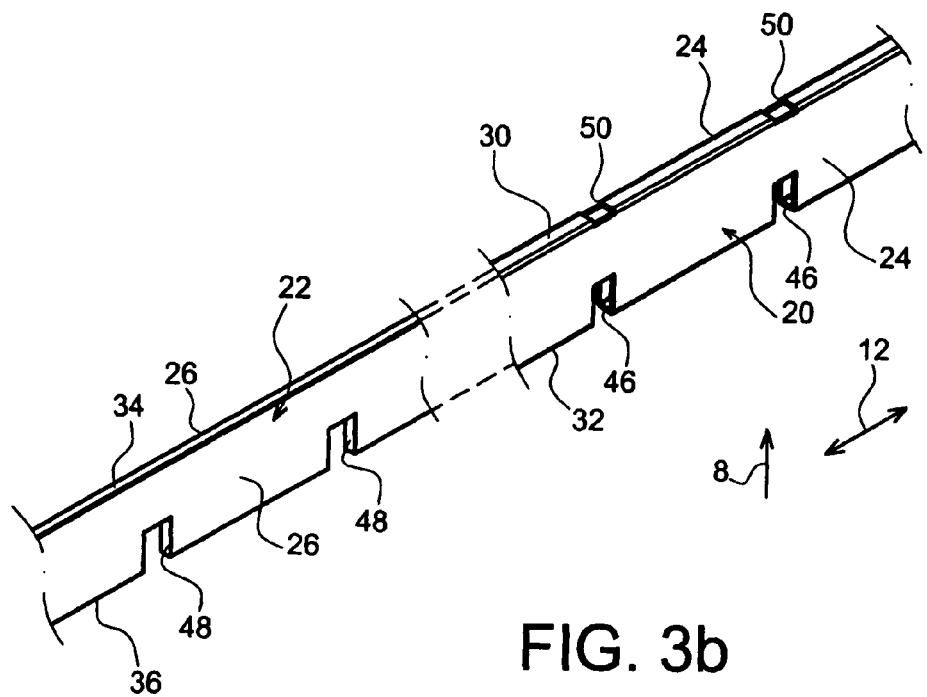
Figure 3C:
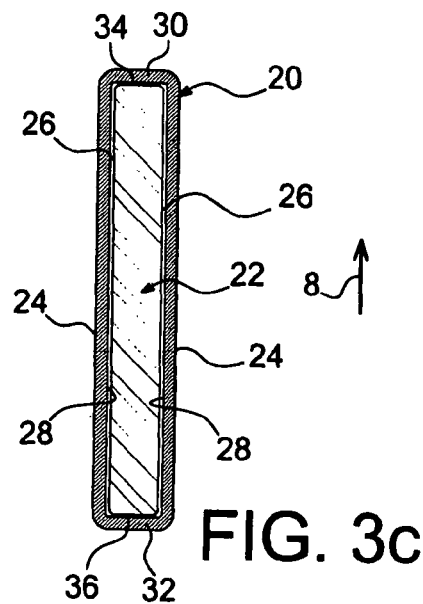
FIG. 3c shows a transversal cross-section view of the slotted structural assembly shown in FIGS. 3a and 3b, with the cutting plane passing through a current cross-section of the structural assembly.
Figure 4:
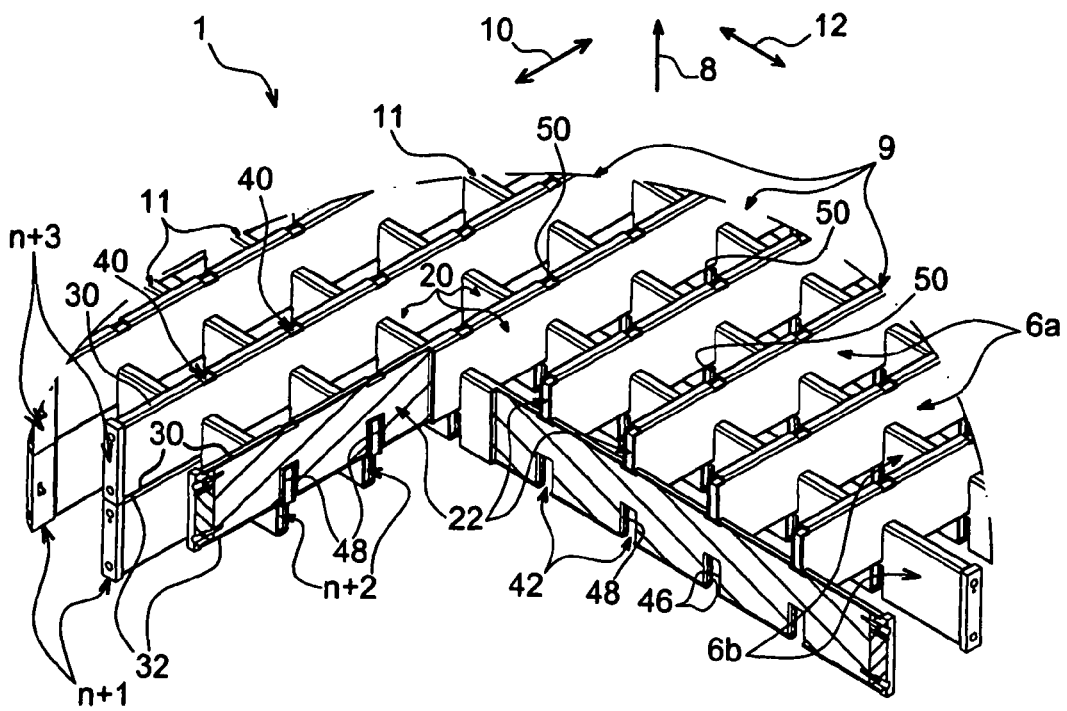
FIG. 4 is a partial perspective view of the storage device according to the first preferred embodiment, showing a plurality of stacking and intercrossing slotted structural assemblies, such as those shown in FIGS. 3a to 3c.

Now in reference to FIG. 4, a portion of a storage device 1 can be observed according to a first preferred embodiment of this invention, this device 1 being realised using a stack of slotted structural assemblies 6a, 6b such as that shown in FIGS. 3a to 3c. As such, it is noted that assemblies 6a constituting partitions 9 are identical or similar to the assemblies 6b constituting partitions 11, and of which one thereof shall now be described in reference to FIGS. 3a to 3c.

In a first preferred embodiment of this invention, slotted structural assembly 6b is constituted of a stainless steel tubular cross-section element 20, inside of which is located a plate 22 of aluminium and boron alloy. As can best be seen in FIG. 3c, plate 22 has a substantially rectangular form, complementary to that defined interiorly by element 20, thus also having a substantially rectangular transversal cross-section.

In a first preferred embodiment, single plate 22 is effectively provided to be slid between the two lateral flanks 24 of tubular cross-section element 22. So, the two lateral sides 26 of plate 20 are respectively in facial contact with the interior sides 28 of lateral flanks 24 of element 20, with operating clearances being however provided in order to allow for mounting and differential expansion.

Moreover, tubular cross-section element 20 extends between upper edge 30 and lower edge 32 interconnected by the two lateral flanks 24, plate 22 being therefore also slid between the two edges 30, 32. In other terms, upper edge 34 and lower edge 36 of plate 22 are respectively in facial contact with upper edge 30 and lower edge 32 of element 20, with operating clearances being nevertheless provided in order to allow for mounting of one into the other by sliding, and in order to handle the differential expansion encountered due to the distinct nature of the materials used.

Consequently, it is more preferably arranged so that the height of plate 22 according to direction 8 be substantially identical to the inside height of tubular cross-section element 20, in such a way that these plates can together form a structure in neutron material and with high thermal conductivity extending in a substantially continuous manner over the entire length of the basket.

This first preferred embodiment, wherein the single plate 22 in neutron material occupies almost the entire inside space defined by tubular cross-section element 20, is preferentially intended for the constitution of a storage basket for fuel assemblies of the BWR type.

As can be seen in FIG. 3a, structural assembly 6b has an upper portion provided with upper slots 40 as well as a lower portion provided with lower slots 42, with upper slots 40 having the specificity of having a height according to direction 8 which is lower than that of lower slots 42.

In this regard, it is more preferably arranged such that the sum of the heights of upper slots 40 and lower slots 42 disposed opposite the latter are approximately equal to half of the height of structural assembly 6b, so as to obtain lateral walls that are substantially continuous after stacking and intercrossing assemblies 6a, 6b.

Each of the lower slots 42 is realised using a notch 46 formed across the entire thickness of the tubular cross-section element 20, and a notch 48 of substantially identical height formed across the entire thickness of single plate 22.

Consequently, when plate 22, preferably already equipped with notches 48 thereof, is slid inside tubular element 20 also preferably already equipped with notches 46 thereof, these notches 46, 48 coinciding then two by two in order to form the lower slots 42 of assembly 6b. For information purposes, it is stipulated that notches 48 formed in the first aluminium-based material are preferentially substantially wider in direction 12 than notches 46 formed in the second material constituted by stainless steel, as can moreover be seen in FIG. 3a. This difference in width makes it possible to manage differential expansion according to direction 12 between the first and second material of assembly 6b.

On the contrary, upper slots 40 are each realised solely using a single notch 50 formed on the upper edge 30 of the steel tubular cross-section element 20, with edge 34 of plate 22 thereof having no notch and having because of this a constant cross-section over the entire length of structural assembly 6b.

As previously indicated, this configuration wherein lower slots 42 are larger than upper slots 40 in stacking direction 8, is provided in order to reinforce the mechanical rigidity of the basket in case of vertical free-fall in direction 8. Effectively, during the impact following such a vertical free-fall, elements 20 stopped in translation at the ends thereof as shall be described hereinafter, are subject to bending, with the sweep being established in direction 8, i.e. towards the upper portion of the container then oriented towards the bottom. This bending thus causes a closing of notches 46 and an opening of notches 50 of smaller dimensions. Given that elements 20 are preferentially highly adjusted at the cross-overs, the clearance that it is necessary to fill so that reclosing notch 46 comes into contact with intercrossed element 20 is highly reduced. Thus, when bending occurs, reclosing notch 46 comes into contact rapidly with intercrossed element 20 housed in the associated slot 42, thus causing a considerable increase in the stiffness in the cross-over zone.

In FIG. 4 where a plurality of assemblies 6a, 6b are stacked and intercrossed, it is noted first of all the presence of a layer n+1 of assemblies 6a parallel in relation to one another. Furthermore, a layer n+2 is disposed directly on top of layer n+1 in stacking direction 8, and is constituted of assemblies 6b cooperating with assemblies 6a of layer n+1, by the intermediary of slots 40, 42 provided for this purpose. As such, assemblies 6b of layer n+2 and assemblies 6a of layer n+1 are therefore arranged in a directly consecutive manner in stacking direction 8, and are disposed in a crossed manner in relation to one another.

Finally, a layer n+3 is disposed directly on top of layer n+2 in stacking direction 8, and is constituted of assemblies 6a cooperating with assemblies 6b of layer n+2, by the intermediary of slots 40, 42. Assemblies 6b of layer n+2 and assemblies 6a of layer n+3 are consequently arranged in a directly consecutive manner in stacking direction 8, and are disposed in a crossed manner in relation to one another. Moreover, as can be seen in FIG. 4, structural assemblies 6a of layers n+1 and n+3 are very close together or in contact two by two on edges 30, 32 of tubular elements 20.

More generally, it is indicated that each upper slot 40 of lower height is intended to cooperate with a lower slot 42 of an adjacent structural assembly, and inversely.

Figure 5A:
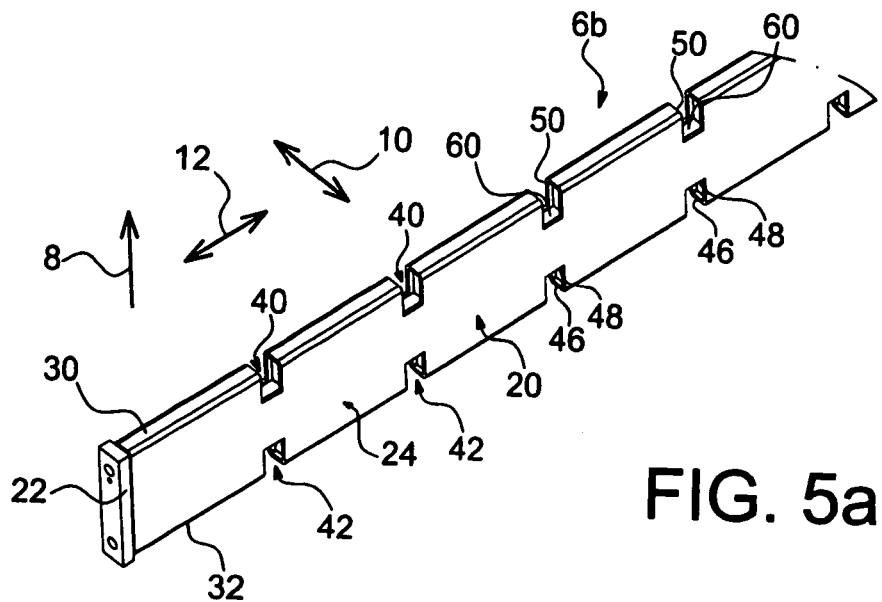
Figure 5B:
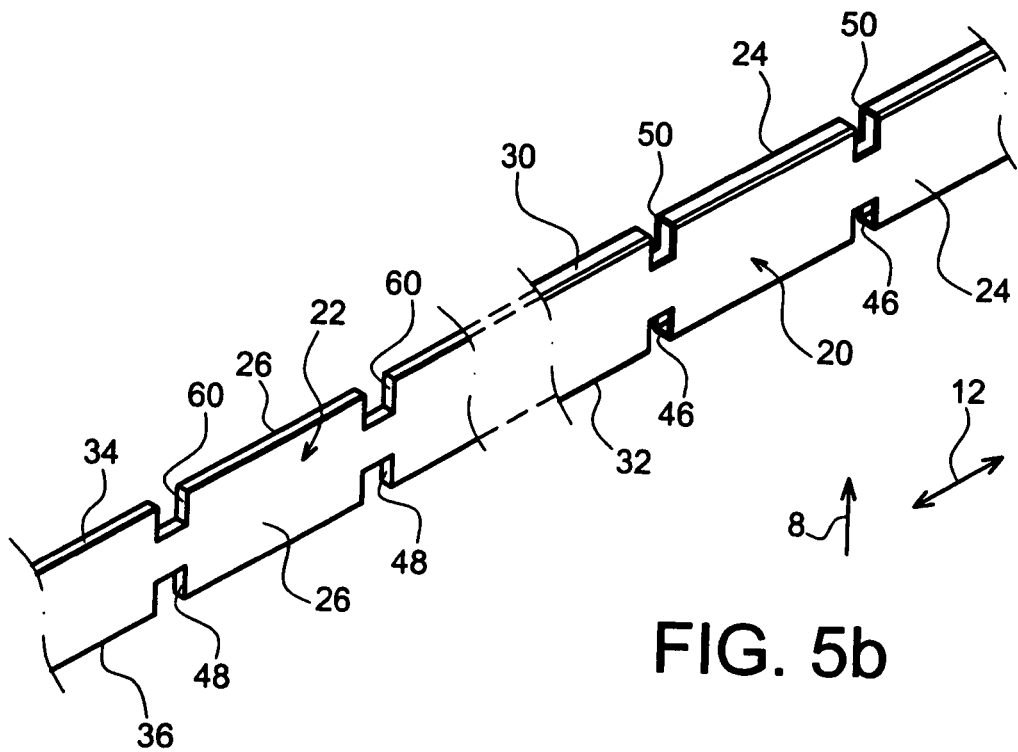

Now in reference to FIGS. 5a to 5b, an alternative of this first preferred embodiment can be seen, of design that is largely similar to that which has just been described. As such, and for all of the figures, elements bearing the same numerical references correspond to identical or similar elements.

As such, it can be seen in this alternative that the primary modification resides in the fact that upper slots 40 and lower slots 42 now have the same height according to direction 8, the sum of the heights being still provided to be approximately equal to half of the height of structural assembly 6b.

To do so, each upper slot 40 can no longer be realised solely using a single notch 50 on the upper edge 30 of element 20, but is now obtained also using an upper notch 60 provided on edge 34 of plate 22, coinciding with this same notch 50 as shown in FIG. 5a. Consequently, in this alternative, upper slots 40 and lower slots 42 are obtained in a similar manner.

Moreover, without limitation, the transversal cross-section of this assembly in current cross-section is identical to that shown in FIG. 3c.

Figure 6A:
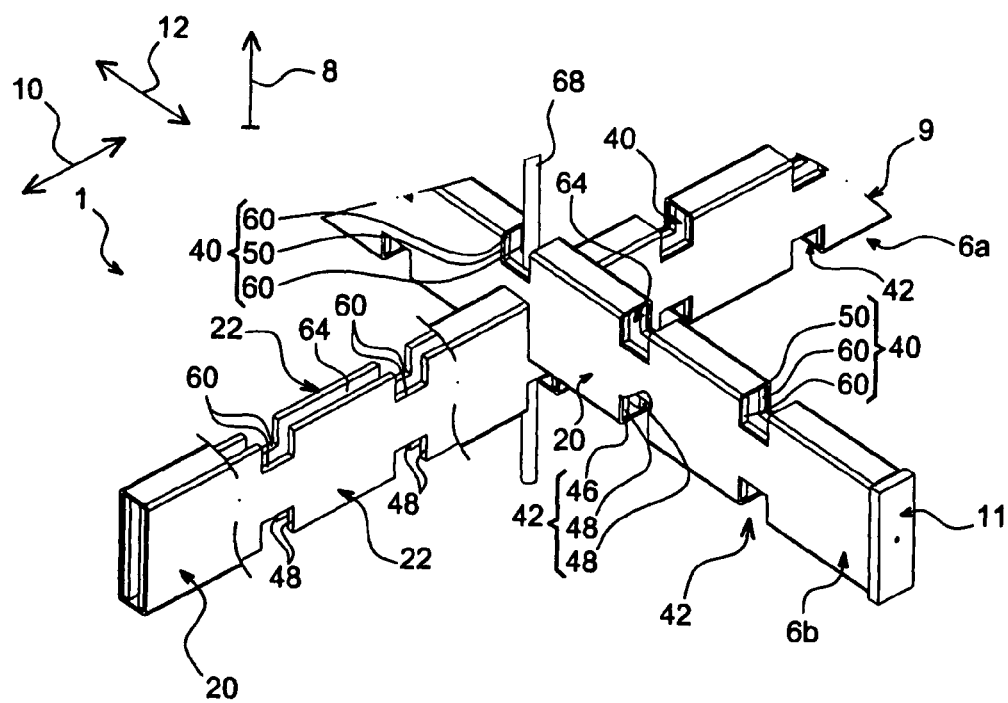
FIG. 6a is a partial perspective view of the storage device according to a second preferred embodiment, showing two stacking and intercrossing slotted structural assemblies.
Figure 6B:
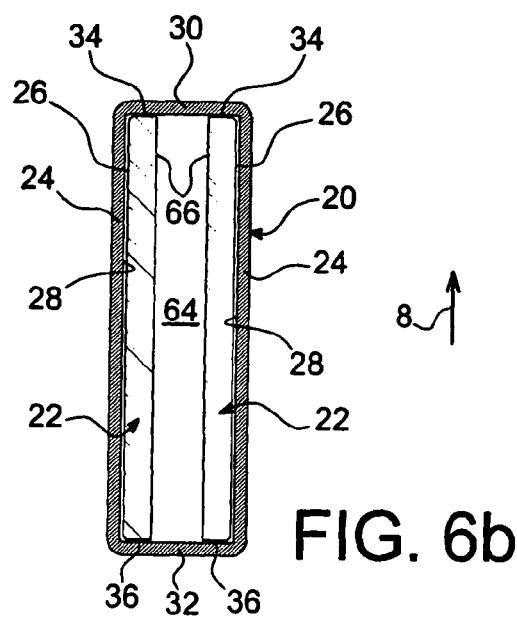

In a second preferred embodiment shown in FIGS. 6a and 6b, structural assemblies 6a, 6b have a configuration of upper and lower slots 40, 42 substantially similar to that described for the aforementioned alternative, although it could alternatively be of the type as that shown in FIGS. 3a to 3c. The second preferred embodiment is therefore distinguished from the first by the fact that it no longer incorporates a single plate of a first material, occupying the quasi-totality of the space defined by associated element 20, but two distinct plates 22 spaced one in relation to the other.

More precisely, the spacing between two plates 22 makes it possible to define a space 64 likely to be occupied by water, with the purpose of maintaining the sub-criticality of the storage device, when the latter is loaded with nuclear fuel assemblies. Consequently, this second embodiment is preferentially intended for the constitution of a storage basket for fuel assemblies of the PWR type.

As can best be seen in FIG. 6b, the two identical plates 22 are each provided to be slid between upper 30 and lower 32 edges of the steel element 20 containing them. Moreover, the two identical plates 22 each have an exterior lateral side 26 respectively facing the two interior sides 28 of lateral flanks 24 of element 20, with operating clearances being provided in order to allow for the mounting and to handle the differential expansion. Interior lateral sides 66 of the two plates 22, opposite to the exterior lateral sides 26, face each other and delimit together with the upper 30 and lower 32 edges of steel element 20, a space 64 that can be occupied by water.

Here again, although the thickness of each of two plates 22 is much less than the thickness of tubular element 20, the height of each of these plates 22 according to direction 8 is still substantially identical to the inside height of element 20.

As shown in FIG. 6a, each upper slot 40 is then formed by two upper notches 60 respectively formed on upper edge 34 of the two plates 22, as well as an upper notch 50 formed on the upper edge 30 of tubular element 20, these notches 50, 60, 60 coinciding mutually of course. In the same way, each lower slot 42 is then formed by two lower notches 48 respectively formed on the lower edge 36 of the two plates 22, as well as a lower notch 46 formed on the lower edge 32 of tubular element 20, these notches 46, 48, 48 coinciding mutually.

Finally, it is indicated that spacers 68 of the two plates 22, each taking for example the form of a rod parallel to direction 8, can be placed on slots 40, 42 of device 1. Consequently, it is arranged so that the sum of the diameter of spacers 68 and thicknesses of the two plates 22 are substantially identical to the interior distance between the two lateral flanks 24 of tubular cross-section element 20.

Figure 7:
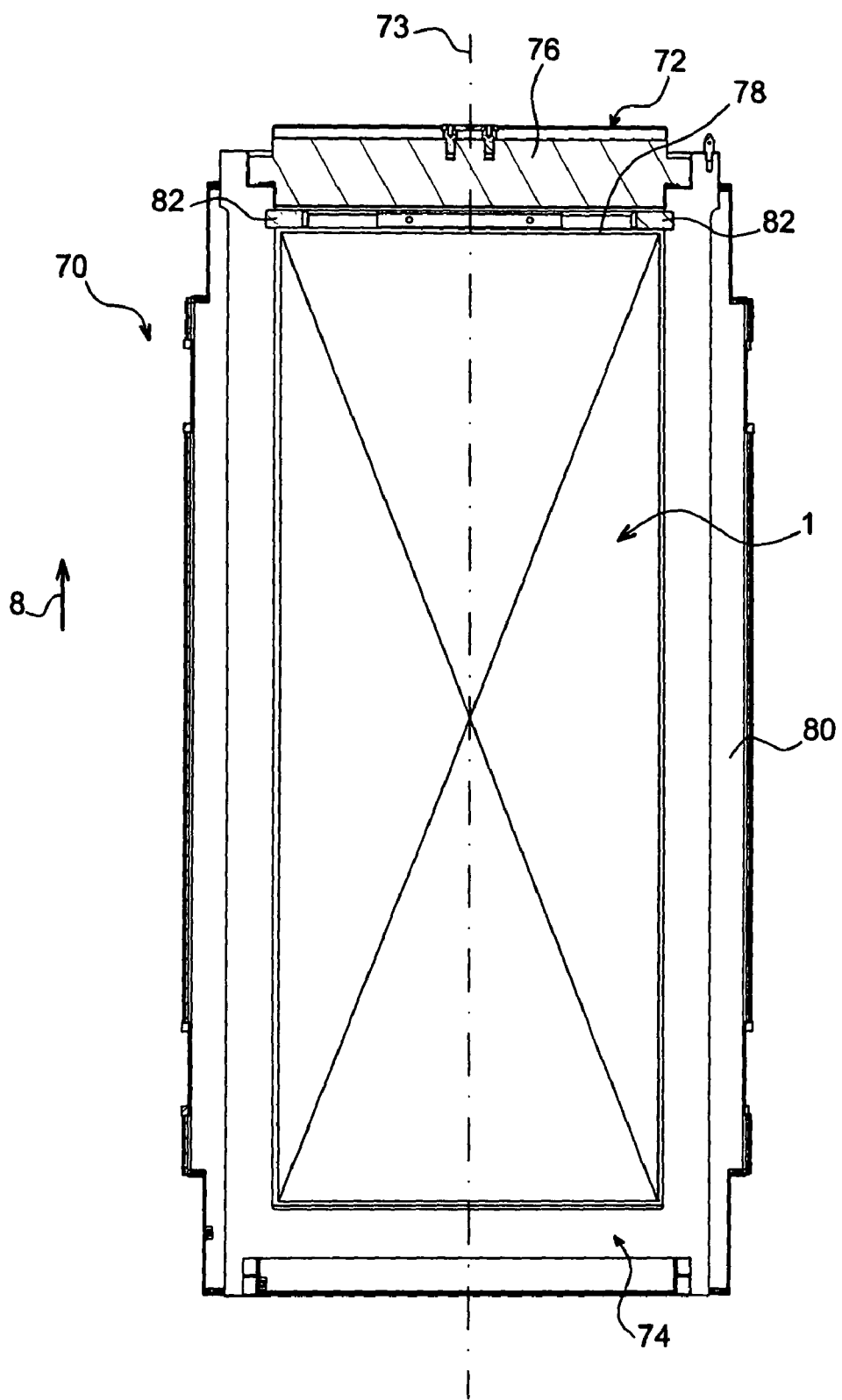
FIG. 7 shows a schematic view of a container integrating a storage device for the storing and/or transporting of nuclear fuel assemblies, such as shown in FIG. 1.

In reference to FIG. 7, a container 70 is shown including generally a casing 72 inside of which is found a storage device 1 such as one of those which has just been described hereinabove, and provided to be placed in a casing, this device 1 being shown solely schematically in FIG. 7.

As known to those skilled in the art, casing 72 of longitudinal axis 73 parallel to stacking direction 8 includes a base 74 on which device 1 rests, as well as a lid 76 closing this casing and disposed at a distance of an upper end 78 of device 1. It also includes a lateral body 80 extending around longitudinal axis 73 merged with a longitudinal axis of device 1.

Moreover, preferably, storage device 1 is locked in translation along axis 73 and in direction 8, in relation to lateral body 80, at a distance from the lid 76. As such, this makes is possible to avoid that device 1 comes to impact lid 76 during a vertical free-fall with this same lid 76 oriented towards the bottom, which would be likely to cause a rupture in the seal of casing 70 provided on this lid.

In order to obtain this locking in translation of basket 1 at a distance from lid 76, stop means are provided taking the form of stop elements 82 housed in an upper portion of lateral body 80, and projecting radially towards the interior of the casing. As can be seen in FIG. 7, the upper end 78 of basket 1 comes as support against these elements 82 during a free-fall. More precisely, it is arranged as such that elements 82 cooperate solely with the perimeter partitions of the storage device, arranged around the stack of structural assemblies.

Figure 8A:
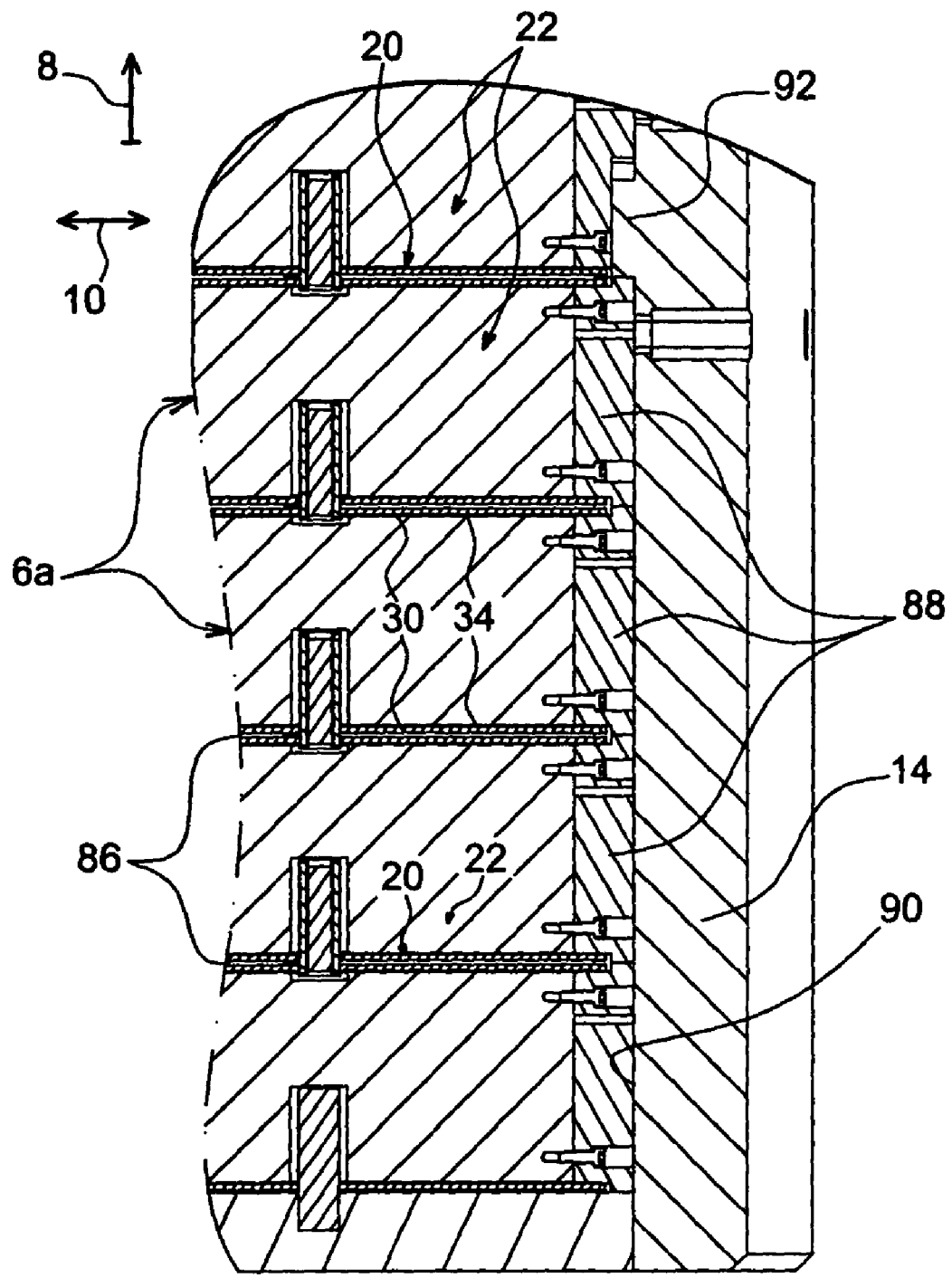
FIGS. 8a and 8b show cross-section views showing the mounting of slotted structural assemblies on the perimeter walls of the storage device.
Figure 8B:
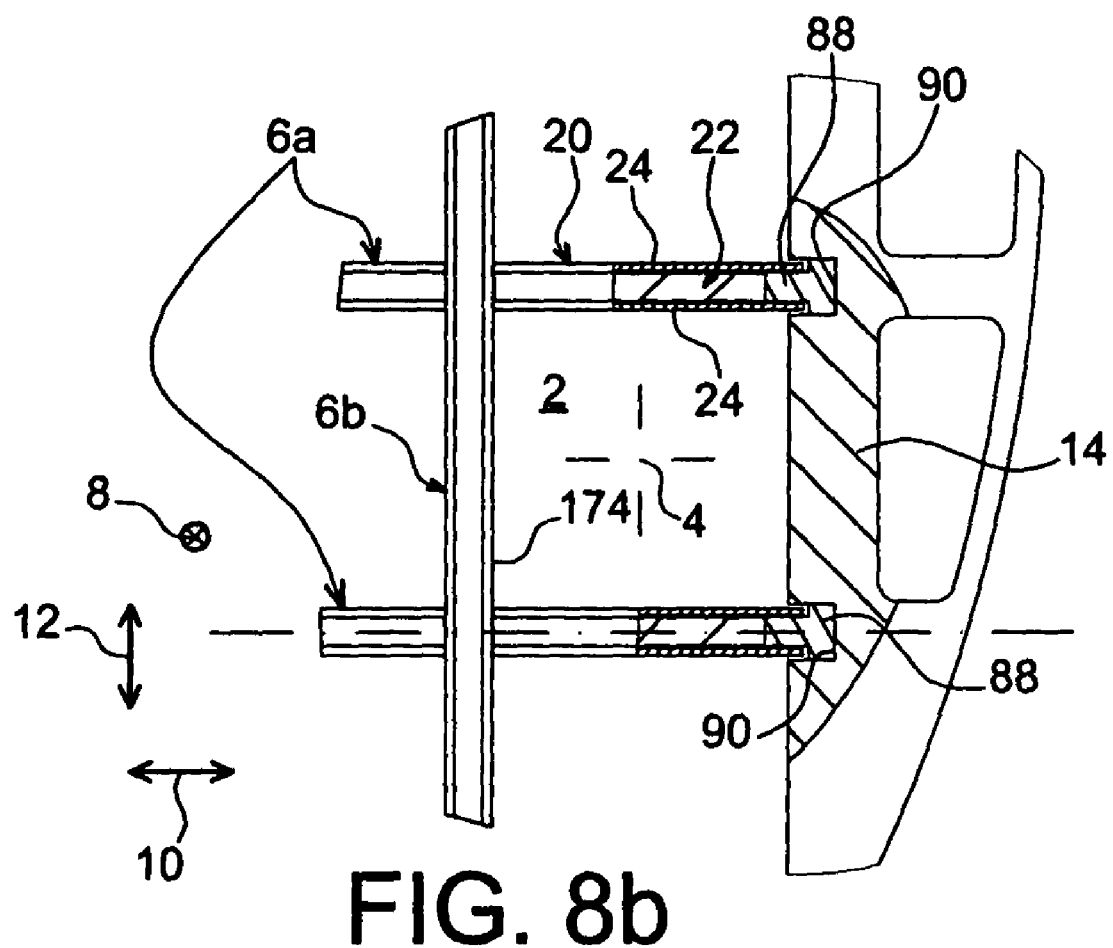

Moreover, in reference to FIGS. 1, 8a and 8b, an example of a preferred embodiment can be seen for the mounting of structural assemblies 6a, 6b on the perimeter partitions 14.

Generally, it is arranged such that each structural assembly 6a, 6b has two opposite ends each mounted on a perimeter partition 14, in such a way that a clearance 86 is present between any two directly consecutive structural assemblies, as can be seen in FIG. 8a.

To do so, each structural assembly end is equipped with an assembly element 88 called a trip dog, which penetrates inside tubular cross-section element 20 until it comes into contact with the plate 22 to which it is attached, for example by screwing. The portion of the trip dog 88 projecting into the exterior of the structural assembly is housed in a longitudinal channel 90 formed on an interior side of perimeter partition 14 considered, the height of trip dogs 88 according to direction 8 being therefore provided in such a way as to have clearance 86 appear between tubular elements 20, when these trip dogs are in contact with each other in longitudinal channel 90, as can best be seen in FIG. 8a.

Clearances 86 obtained make it possible to dissociate the maintaining of each of the structural assemblies, which are therefore maintained on perimeter partitions 14 independently from one another. Justification of the mechanical strength of the totality of basket 1 in terms of axial drop can then be provided by the simple justification of the mechanical strength of any one of the structural assemblies of this basket 1.

Without limitation, it can be provided that each longitudinal channel 90 has stops 92 on each one of which a series of trip dogs 88, disposed between two directly consecutive stops 92, is likely to come as support during a vertical free-fall of the container. This makes it possible to limit the compressive stresses transiting trip dogs 88 to acceptable values.

Of course, diverse modifications can be made by those skilled in the art to storage devices 1 and to the container that has just been described, solely by way of example without limitation.

The invention claimed is:

1. Storage device for the storing and/or transporting of nuclear fuel assemblies, said device comprising
a plurality of adjacent housings, each having a lateral wall, and being able to receive a nuclear fuel assembly therein, said lateral wall being realized using stacking and intercrossing slotted structural assemblies, the structural assemblies oriented lengthwise along a horizontal axis,
each structural assembly including at least one plate realized in a first material comprising aluminium, characterized in that each structural assembly further comprises a tubular cross-section element having a hollow interior defined between an upper edge and a lower edge and two lateral flanks, wherein the at least one plate is slidably positioned within the hollow interior along the horizontal axis, the structural assembly having a plurality of vertical slots on its outer surface to allow stacking and intercrossing with an adjacent structural assembly to at least partially form said lateral wall, the at least one plate having a first vertically oriented notch and the tubular cross-section having a second vertically oriented notch, wherein the first notch and the second notch are located to coincide with one another to form the corresponding vertical slot when the at least one plate is positioned within the tubular cross-section element, the tubular cross-section element being realized in a second material selected from steels and titanium or alloys of steels and titanium.

2. Storage device according to claim 1, characterized in that one of said first and second materials are different from one another.

3. Storage device according to claim 2, characterized in that said first material from which is realized each plate comprising aluminium and a neutrophage element(s).

4. Storage device according to claim 3, characterized in that said neutrophage element(s) are selected from the group consisting of the following elements: boron, gadolinium, hafnium, cadmium, indium, samarium and europium.

5. Storage device according to claim 1, characterized in that each housing has a lateral surface delimiting it, said lateral surface being at least partially constituted by said tubular cross-section elements of slotted structural assemblies forming the lateral wall of the housing.

6. Storage device according to claim 1, characterized in that said at least one plate is constituted by a single plate.

7. Storage device according to claim 1, characterized in that said at least one plate is constituted by two plates spaced one in relation to the other.

8. Storage device according to claim 7, characterized in that said two spaced plates respectively face the interior sides of said two lateral flanks of said steel tubular cross-section element.

9. Storage device according to claim 1, characterized in that at least one structural assembly has an upper portion provided with upper slots as well as a lower portion provided with lower slots, upper and lower slots substantially presenting the same height.

10. Storage device according to claim 9, characterized in that each of the upper and lower slots is realized using a notch formed in said tubular cross-section element, and a notch formed in each plate of said structural assembly.

11. Storage device according to claim 1, characterized in that at least one structural assembly has an upper portion provided with upper slots as well as a lower portion provided with lower slots, with the upper slots having a height that is lower than that of lower slots.

12. Storage device according to claim 11, characterized in that each of the upper and lower slots is realized using a notch formed in said tubular cross-section element, and a notch formed in each plate of said structural assembly.

13. Storage device according to claim 11, characterized in that each of the lower slots is realized using a notch formed in said tubular cross-section element, and a notch formed in each plate of said structural assembly, and in that each of the upper slots is realized solely using a notch formed in said tubular cross-section element.

14. Storage device according to claim 1, characterized in that said tubular cross-section element of each structural assembly has a substantially rectangular or square cross-section.

15. Storage device according to claim 1, characterized in that it further includes a plurality of perimeter walls arranged around the stack of structural assemblies.

16. Storage device according to claim 15, characterized in that each structural assembly has two opposite ends each mounted on one of said plurality of perimeter walls, such that a clearance is present between any two directly consecutive structural assemblies of a same lateral wall.

17. Container for the storing and/or transporting of nuclear fuel assemblies, said container including a casing inside of which is housed a storage device having a plurality of adjacent housings, at least one housing being able to receive a nuclear fuel assembly therein, wherein the at least one housing is defined by four lateral walls formed by stacking and intercrossing slotted structural assemblies, each structural assembly including an outer tubular cross-section element being realized in a second material selected from steels and titanium or alloys of steels and titanium, the outer tubular cross-section element having a hollow interior area therein oriented in a horizontal direction, and at least one plate realized in a first material comprising aluminium, wherein the at least one plate is slidably inserted the hollow interior area, the outer tubular element having a vertical first notch and the at least one plate having a vertical second notch, wherein the first notch and the second notch coincide to form an overall slot in the structural assembly.

18. Container according to claim 17, characterized in that said casing includes a base, a lid, as well as a lateral body extending around a longitudinal axis of casing merged with a longitudinal axis of said storage device, said storage device being locked in translation at a distance from said lid in relation to lateral body of casing, along the longitudinal axis of casing, in the direction of said lid.

19. Container according to claim 18, characterized in that the locking in translation is carried out using stop means attached to lateral body of casing and cooperating with perimeter walls of storage device, arranged around the stack of structural assemblies.

20. Storage device according to claim 1, characterized in that at least one of said first and second materials comprises a neutrophage element(s).

* * * * *